United States Patent
Kashima

(10) Patent No.: US 7,468,109 B2
(45) Date of Patent: Dec. 23, 2008

(54) HIGH STRENGTH STEEL SHEET HAVING EXCELLENT STRETCH FLANGEABILITY

(75) Inventor: Takahiro Kashima, Kakogawa (JP)

(73) Assignee: Kobe Steel, Ltd., Kobe-shi (JP)

( * ) Notice: Subject to any disclaimer, the term of this patent is extended or adjusted under 35 U.S.C. 154(b) by 0 days.

(21) Appl. No.: 11/736,813

(22) Filed: Apr. 18, 2007

(65) Prior Publication Data
US 2008/0023112 A1   Jan. 31, 2008

(30) Foreign Application Priority Data
May 29, 2006   (JP)   ............... 2006-148611

(51) Int. Cl.
C22C 38/02 (2006.01)
C22C 38/04 (2006.01)
C22C 38/06 (2006.01)
C21D 8/04 (2006.01)
C21D 6/00 (2006.01)

(52) U.S. Cl. .................. 148/320; 148/663; 148/653

(58) Field of Classification Search ............... 148/320, 148/663, 654
See application file for complete search history.

(56) References Cited

U.S. PATENT DOCUMENTS

| | | | |
|---|---|---|---|
| 6,540,846 B2 | 4/2003 | Kashima et al. | |
| 6,554,918 B2 | 4/2003 | Kashima et al. | |
| 7,090,731 B2 | 8/2006 | Kashima et al. | |
| 2003/0084966 A1 | 5/2003 | Ikeda et al. | |
| 2005/0081966 A1 | 4/2005 | Kashima et al. | |
| 2007/0023113 A1 | 2/2007 | Ikeda et al. | |

FOREIGN PATENT DOCUMENTS

| | | |
|---|---|---|
| EP | 1 553 202 A1 | 7/2005 |
| EP | 1 559 798 A1 | 8/2005 |
| EP | 1 589 126 A1 | 10/2005 |

(Continued)

OTHER PUBLICATIONS

U.S. Appl. No. 11/736,813, filed Apr. 18, 2007, Kashima.

(Continued)

*Primary Examiner*—Deborah Yee
(74) *Attorney, Agent, or Firm*—Oblon, Spivak, McClelland, Maier & Neustadt, P.C.

(57) ABSTRACT

Disclosed is a steel sheet including 0.10 to 0.20 mass % of C, 0.8 to 2.5 mass % of Si, 1.5 to 2.5 mass % of Mn, and 0.01 to 0.10 mass % of Al, wherein P is limited to less than 0.1 mass %, and S is limited to less than 0.002 mass % and more than 0 mass %, and the structure includes bainitic ferrite and residual austenite such that area percentage of the bainitic ferrite in relation to the entire structure is at least 70%, area percentage of the residual austenite is 2 to 20%, and total area percentage of polygonal ferrite and quasi-polygonal ferrite is up to 15%, and proportion of the residual austenite having an average particle size of up to 5 μm in the residual austenite is at least 60%. The steel sheet is a TRIP steel sheet which has bainitic ferrite as its matrix, and it has a tensile strength (TS) of at least 980 MPa as well as an excellent stretch flangeability.

15 Claims, 4 Drawing Sheets

FOREIGN PATENT DOCUMENTS

| | | |
|---|---|---|
| EP | 1 676 932 A1 | 7/2006 |
| JP | 2003-193193 * | 7/2003 |
| JP | 2004-190050 | 7/2004 |
| JP | 2004-323951 | 11/2004 |
| JP | 2004-332100 | 11/2004 |
| WO | WO 2006/106733 | 10/2006 |

OTHER PUBLICATIONS

U.S. Appl. No. 11/910,013, filed Sep. 28, 2007, Kashima et al.

* cited by examiner

CAL (RQ)

CAL (WQ)

CGL

RESIDUAL γ (MINUTE)
BAINITIC FERRITE MATRIX
POLYGONAL FERRITE
10 μm

RESIDUAL γ (LATH)
BAINITIC FERRITE MATRIX
10 μm

US 7,468,109 B2

HIGH STRENGTH STEEL SHEET HAVING EXCELLENT STRETCH FLANGEABILITY

CROSS-REFERENCE TO RELATED APPLICATION

The present application claims priority to Japanese patent application JP 2006-148611, filed on May 29, 2006.

BACKGROUND OF THE INVENTION

1. Field of the Invention

This invention relates to a high strength steel sheet having an excellent stretch flangeability, and more specifically, to a high strength steel sheet having a tensile strength (TS) of at least 980 MPa, as well as well balanced tensile strength and stretch flangeability as represented by the product of the TS and the stretch flangeability ($\lambda$) (TS×$\lambda$) of 50,000 or higher. The high strength steel sheet of the present invention may find a general use in the industrial fields including automobiles, electric appliances, and mechanics.

2. Description of the Related Art

The steel sheet which is used in the field of automobiles, electricity, and mechanics by press forming is required to have an excellent strength simultaneously with an excellent ductility. As a steel sheet which satisfies such requirements, TRIP (TRansformation Induced Plasticity) steel sheets have been focus of attention. These TRIP steel sheets contain residual austenite (residual $\gamma$) which is present as the residue of the austenite ($\gamma$) structure, and when the shape of the TRIP steel sheet is changed, this residual austenite transforms into martensite under the stress, and excellent elongation is realized by the $\gamma$ simultaneously with the high strength realized by the martensite. TRIP steel sheets are classified by the type of the matrix into TRIP-aided dual phase steel (TDP steel) having the matrix of polygonal ferrite, TRIP-aided tempered martensite steel (TAM steel) having the matrix of annealed martensite, TRIP-aided bainite ferrite steel (TBF steel) having the matrix of bainitic ferrite, and the like.

Among these, TBF steel has the feature that high strength is readily realized by the rigid bainite structure as well as high elongation properties. However, this TBF steel also has the drawback of inferior stretch flangeability (hole expansion property, or local ductility).

In order to obviate the problems as described above, Japanese Patent Application Laid-Open Nos. 2004-323951 and 2004-332100 propose techniques for improving hole expansion property (having the meaning equal to that of the stretch flangeability) and resistance to hydrogen enbrittlement of the TBF steel by minimizing proportion of the residual $\gamma$. These techniques have been completed based on the conventional conception that "considerable loss in the hole expansion properties is induced when martensite or residual austenite is used for the second phase".

SUMMARY OF THE INVENTION

The present invention has been completed in view of the situation as described above, and an object of the present invention is to provide a high strength steel sheet which has a tensile strength (TS) of the level as high as 980 MPa or higher simultaneously with excellent stretch flangeability in the TRIP steel sheet having the matrix of bainitic ferrite.

In one aspect, the steel sheet of the present invention which has obviated the problems as described above includes 0.10 to 0.20% of C ("%" meaning "% by mass", and this also applies to the following description), 0.8 to 2.5% of Si, 1.5 to 2.5% of Mn, and 0.01 to 0.10% of Al, wherein P is limited to less than 0.1%, and S is limited to less than 0.002% and more than 0%, and the structure includes bainitic ferrite and residual austenite such that area percentage of the bainitic ferrite in relation to the entire structure is at least 70%, area percentage of the residual austenite is 2 to 20%, and total area percentage of polygonal ferrite and quasi-polygonal ferrite is up to 15%, and proportion of the residual austenite having an average particle size of up to 5 µm in the residual austenite is at least 60%.

In a preferred embodiment, the steel sheet further may include 0.0003 to 0.002% of Ca.

The present invention which is constituted as described above can provide a high strength steel sheet which has a tensile strength (TS) of the level as high as 980 MPa or higher simultaneously with excellent stretch flangeability. Formation of various parts used in automobiles and other industrial machines where high strength is required will be facilitated by the use of the steel sheet according to the present invention.

BRIEF DESCRIPTION OF THE DRAWINGS

Embodiments of the present invention will be described in detail based on the following figures, wherein:

FIGS. 2A and 2B schematically show heating pattern of the continuous annealing line (CAL), wherein FIG. 2A shows the case of roll quenching (RQ) and FIG. 2B shows the case of water quenching (WQ);

DESCRIPTION OF THE INVENTION

The inventors of the present invention have made an intensive study to mainly improve the stretch flangeability of the TRIP steel sheet (TBF steel) containing bainitic ferrite (BF) structure as it matrix. As a result of such study, the inventors found that remarkable improvement in the stretch flangeability ($\lambda$) can be realized when the shape of the residual austenite (residual $\gamma$) is regulated so that it has an average particle size as minute as 5 µm, and such minute residual $\gamma$ can be generated particularly when the steel sheet is tempered at a lower temperature in the continuous annealing line compared to conventional production before the galvanization. The present invention has been completed on the bases of such finding.

Figure 1:
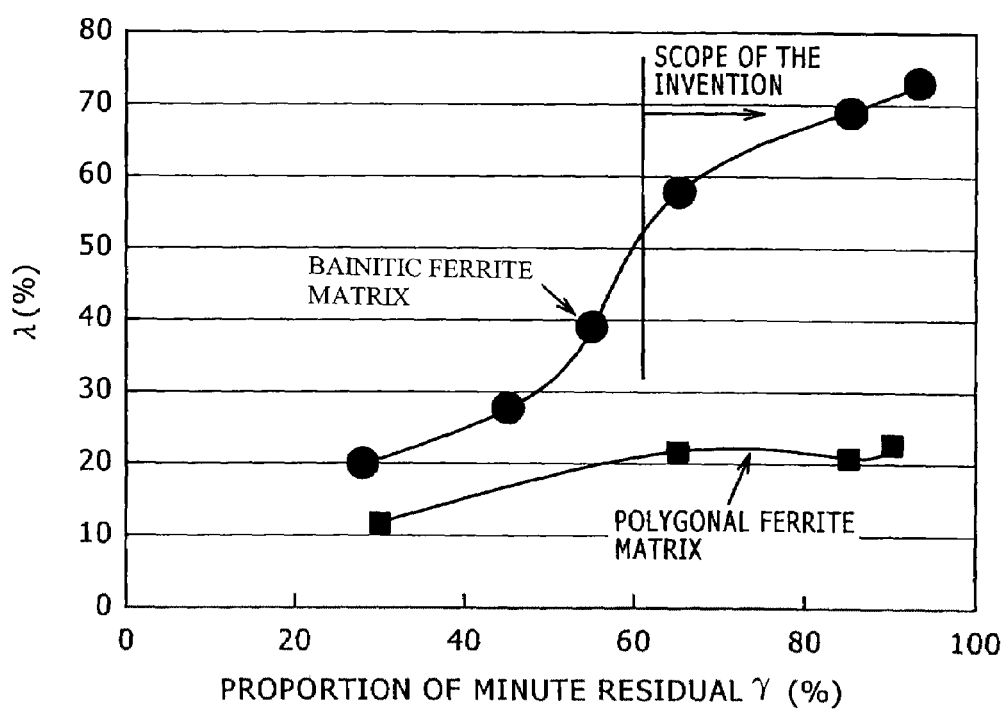
FIG. 1 is a graph showing the stretch flangeability ($\lambda$) in relation to the proportion of minute residual $\gamma$.

The effect of the $\lambda$ improvement by the size reduction of the residual $\gamma$ is described by referring to FIG. 1. In FIG. 1, the x axis represents the proportion (%) of the residual $\gamma$ having an average particle size of up to 5 µm (hereafter occasionally referred to as "minute residual $\gamma$") in relation to all residual $\gamma$, and the y axis represents the hole expansion rate ($\lambda$)

As shown in FIG. 1, in the case of TBF steel (● in the graph) having the BF as its matrix, $\lambda$ remarkably increases when the proportion of the minute residual $\gamma$ is 60% or higher. In FIG. 1, the results (■ in the graph) of the TRIP steel sheet (TDP steel) having polygonal ferrite (PF) as its matrix are also indicated for the purpose of reference, and comparison of the TBF steel and the TDP steel reveal that the increase in the λ by the minute residual γ is far more significant in the TBF steel compared to the TDP steel.

The result plotted in FIG. 1 for the TBF steel corresponds to the data of Nos. 16 to 21 of Table 3 in the Examples as described below, and the result of the TDP steel corresponds to the data of Nos. 1 to 4 of Table 5.

The high strength steel sheet of the present invention has a tensile strength (TS) of at least 980 MPa and the product of the TS and the stretch flangeability (λ) (TS×λ) of 50,000 or higher, and preferably, a tensile strength (TS) of at least 1,000 MPa and the product of the TS and the stretch flangeability (λ) of 60,000 or higher. The high strength steel sheet of the present invention also has an elongation (total elongation) property of 18% or higher, and preferably 20% or higher.

The present invention includes not only the galvanized steel sheet but also the alloyed galvanized steel sheet. The present invention also includes the steel sheet which does not have the zinc plating layer, namely, the steel sheet which has been produced by a heat treatment having the same effect as the galvanizing step.

First, the structure which is the most significant feature of the present invention is described.

(Structure)

The high strength steel sheet of the present invention contains at least bainitic ferrite and residual γ, and it has the structure wherein area percentage of the bainitic ferrite in relation to the entire structure is at least 70%, residual γ is 2 to 20%, polygonal ferrite and/or quasi-polygonal ferrite is up to 15%, and proportion of the residual γ having an average particle size of up to 5 μm in the residual γ is at least 60%.

Bainitic ferrite: at Least 70%

The steel sheet of the present invention contains bainitic ferrite (BF) as a predominant component (matrix).

With further reference to BF, BF means substructure (which may or may not have a lath structure) which has high dislocation density (initial dislocation density), and it is clearly distinguished from the bainite structure by the absence of carbide in the structure. BF is also different from polygonal ferrite (PF) which has a substructure containing no or extremely little dislocation density, and quasi-polygonal ferrite (quasi-PF) having the substructure of fine sub-grains and the like. These structures are shown, for example, in Atlas for Bainitic Microstructures Vol. 1 (Bainitic Comm. of the Iron and Steel Institute of Japan), page 4, Table 1, and in this Table 1, BF is $\alpha_B$ and $\alpha_B^\circ$, PF is $\alpha_p$, and quasi-PF is $\alpha_q$. Furthermore, BF and PF/quasi-PF are clearly distinguished as described below when observed by a transmission electron microscope (TEM) at a magnification of about 10,000.

PF: white in TEM photograph; polygonal shape; contains no residual γ or martensite in the interior.

quasi-PF: white in TEM photograph; substantially spherical; contains no residual γ or martensite in the interior.

BF: gray in TEM photograph due to high dislocation in the interior. BF and martensite are often undistinguishable by TEM observation.

BF has a higher dislocation density compared to PF or quasi-PF, and as a consequence, it has a characteristic feature that high strength is readily attained simultaneously with excellent elongation properties and high stretch flangeability. In order to enable effective use of such feature, area percentage of BF is preferably controlled to at least 70%, and more preferably, to at least 80%, and still more preferably, to at least 90%. In order to obtain a high strength steel sheet having further improved stretch flangeability, control of the conditions is recommended so that the steel substantially has a dual phase structure of BF and the residual γ as described below.

Residual γ: 2 to 20%

Residual γ is a structure particularly effective for improving the elongation. As described in Japanese Patent Application Laid-Open Nos. 2004-323951 and 2004-332100, presence of the residual γ in the TBF steel normally results in the poor stretch flangeability. However, stretch flangeability can be improved by increasing the proportion of the minute residual γ in the residual γ as in the case of the present invention.

In order to effectively realize such action, area percentage of all residual γ is controlled to at least 2%. However, since excessive residual γ invites loss of stretch flangeability, upper limit is set at 20%. The area percentage of the residual γ is preferably at least 5% and up to 18%, and more preferably, at least 7% and up to 16%.

In addition, concentration of C in the residual γ is preferably at least 0.8%. Concentration of C in the residual γ greatly affects the property of TRIP (TRansformation Induced Plasticity), and control of the C concentration to at least 0.8% is effective particularly in improving the elongation property. The elongation property improves with the increase in the C concentration in the residual γ, and C concentration is preferably at least 1%, and more preferably at least 1.2%. Upper limit of the C concentration in the residual γ is not particularly limited, and the upper limit which can be adjusted in the practical production procedure is believed to be about 1.6%.

Proportion of residual γ having an average particle size of up to 5 μm in the residual γ: ≧60%

In order to realize the intended stretch flangeability and elongation property, presence of a larger amount of the residual γ having an average particle size of up to 5 μm is preferable, and in the present invention, proportion of the minute residual γ in relation to all residual γ is at least 60%. However, a higher proportion of such minute residual γ is preferable, and preferably, the minute residual γ includes at least 70%, more preferably at least 80%, and most preferably 100%.

The average particle size is measured by the procedure as described below. First, steel sheet is etched with a repeller, and the residual γ is identified by observing the steel sheet with an optical microscope (at a magnification of 1000), and average particle size of the residual γ (maximum diameter) present in the visual field of 60 mm×80 mm is calculated. The average particle size is calculated for another 5 fields by the same manner, and the average of the 5 visual fields in total were used as the "average particle size of the residual γ".

Use of the minute residual γ having a smaller average particle size is preferable, and the average particle size of the minute residual γ is preferably up to 4 μm, and more preferably up to 3 μm. No particular limit is set for the lower limit, and the lower limit would be the particle size which allows identification of the residual γ and calculation of the average particle size by the observation as described above.

In the steel described in Japanese Patent Application Laid-Open Nos. 2004-323951 and 2004-332100 as mentioned above, only the volume ratio of the residual γ is defined, and there is no indication for the proportion of the residual γ having a small particle size (of up to 5 μm). When the residual γ having a particle diameter of up to 5 μm is included at a high proportion as in the case of the present invention, the steel sheet will exhibit an improved elongation and stretch flangeability, and such properties of the steel of the present invention is superior to those of such patent documents.

Polygonal ferrite and quasi-polygonal ferrite: up to 15% in total

The high strength steel sheet of the present invention may be constituted from the structure including the bainitic ferrite (BF) and the residual γ as described above, and such constitution is adapted form maximizing the stretch flangeability. However, the high strength steel sheet of the present invention may further include polygonal ferrite (PF) and/or quasi-polygonal ferrite (quasi-PF) at a total area percentage of up to 15% as long as the merits of the present invention are not adversely affected. However, a smaller area percentage is preferable, and the area percentage of the PF and/or the quasi-PF is preferably up to 10%, and most preferably 0%.

Other Structures

The steel sheet of the present invention may solely include the structure as described above (i.e. mixed structure of the BF and the residual γ, or mixed structure of the BF, the residual γ, and the PF/quasi-PF). The steel sheet of the present invention, however, may also contain other structure (such as pearlite, bainite, martensite, and cementite) at a content that will not adversely affect the merits of the present invention. However, a smaller area percentage is preferable for such content, and the area percentage is preferably up to 10% at most.

(Steel Components)

Next, the basic components constituting the steel sheet of the present invention are described. In the following description, the unit used in describing the steel components are % by mass.

C: 0.10 to 0.20%

C is an element necessary for stably realizing the high strength simultaneously with the intended residual γ. More specifically, C is an important element for the inclusion of a sufficient amount of C in the austenite (γ) phase, and allowing the residue of the desired γ phase at room temperature. In order to effectively realize such action, C is added at a content of at least 0.10%. Excessive addition of C, however, invites loss of weldability, and therefore, an upper limit is set at 0.20%. Content of C is preferably in the range of at least 0.12% and at most 0.18%.

Si: 0.8 to 2.5%

Si is an elements which suppresses formation of carbide by the decomposition of the residual γ, and Si is also effective as an element of contributing for the solid solution strengthening. In order to enable effective realization of such action, Si is added at a content of at least 0.8%. Excessive addition of Si, however, does not only invite saturation of such action but also problems such as brittleness at a high temperature, and therefore, an upper limit is set at 2.5%. Content of C is preferably in the range of at least 1.2% and up to 2.3%.

Mn: 1.5 to 2.5%

Mn is an element which is necessary for stabilizing γ and forming the intended residual γ. In order to enable effective realization of such action, Mn is added at least at 1.5%. Excessive addition of Mn, however, invites adverse effects such as cracking of the cast steel, and therefore, an upper limit of Mn is set at 2.5%. Content of Mn is preferably in the range of at least 1.8% and up to 2.3%.

Al: 0.01 to 0.10%

As in the case of Si, Al is an element which suppresses formation of carbide by the decomposition of the residual γ. In order to enable effective realization of such action, Al is added at a content of at least 0.01%. Addition of the Al in excess of 0.10%, however, facilitates formation of the polygonal ferrite, and the stretch flangeability will not be sufficiently improved. Therefore, content of Al is preferably in the range of at least 0.03% and up to 0.06%.

P: less than 0.1%

Excessive addition of P invites loss of workability, and therefore, an upper limit is set at 0.1%. Smaller content of P is preferable.

S: less than 0.002%

S is a harmful element which forms sulfide inclusions such as MnS, which becomes the starting point of cracks to detract from the workability. Accordingly, an upper limit is set at 0.002%. Smaller content of S is preferable.

The steel sheet of the present invention contains the components as described above, and the residue includes iron and inevitable contaminants. Exemplary such inevitable contaminants include N (nitrogen), 0.01% or less of O (oxygen), and the like from the starting material, the materials and the installation used in the production, and the like depending on the situation.

Preferably, the steel sheet may further include Ca at the content as described below for the purpose of improving the workability, and the like.

Ca: 0.0003 to 0.002%

Ca is an element which is effective in controlling the shape of the sulfides in the steel to thereby improve the workability. In order to enable effective realization of such action, Ca is preferably added at a content of at least 0.0003%. Excessive addition of Ca, however, is uneconomical due to the saturation of the effect of adding the Ca, and an upper limit is preferably set at 0.002%. Preferably, Ca is added at a content in the range of at least 0.0005% and up to 0.0015%.

(Production Method)

Next, the preferable method for producing the steel sheet of the present invention is described.

The production method of the steel sheet of the present invention includes (1) a hot rolling step (optionally followed by a cold rolling step), (2) a continuous annealing step, and (3) a post-heat treatment step (which is typically a galvanization step, and optionally followed by an alloying step). In order to efficiently produce the steel sheet of the present invention, adequate control of the tempering temperature used in the continuous annealing step is particularly important, and the structure containing the matrix bainitic ferrite and the minute residual γ is reliably produced by this step and the following post-heat treatment step.

(1) Hot rolling step

The hot rolling step can be accomplished by the method commonly used in the art, for example, preferably by heating to a temperature of about 1000 to 1300° C. for about 20 to 60 minutes, hot rolling, finish rolling at a temperature of about 850 to 890° C., cooling at an average cooling rate of about 40 to 60° C./sec., and coiling at a temperature of about 500 to 600° C. Thickness of the resulting hot rolled steel sheet is preferably about 2.0 to 3.5 mm.

The hot rolled steel sheet obtained in the above (1) is pickled to remove the scale.

The steel sheet may be further subjected to an optional step of cold rolling at a cold rolling rate of about 50 to 80% in order to improve workability and the like. The resulting cold rolled steel sheet preferably has a thickness of about 0.7 to 1.4 mm.

(2) Continuous annealing step

Figure 2A:
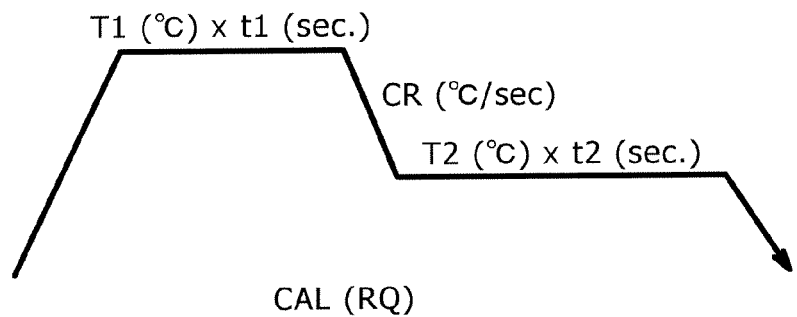
Figure 2B:
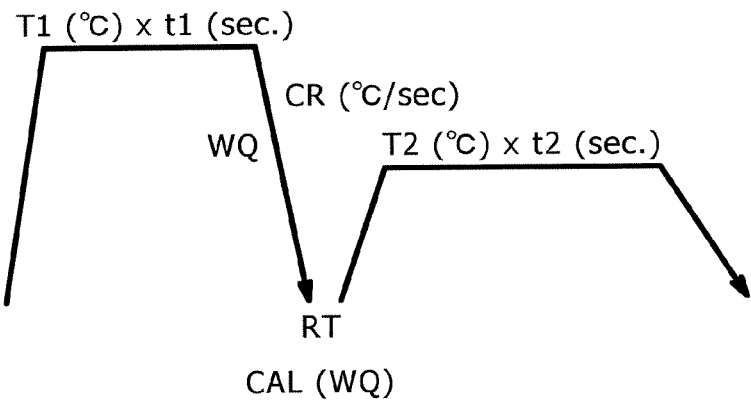

The continuous annealing step is described by referring to FIGS. 2A and 2B. This step is conducted mainly to realize the intended quenched structure (quenched martensite). The only difference between FIG. 2A and FIG. 2B is the cooling conditions after the soaking step [T1 (° C.)×t1 (sec.)], and FIG. 2A is the example of roll quenching (RQ) whereas FIG. 2B is the example of water quenching (WQ).

First, the steel sheet is maintained at a temperature (T1) not lower than $A_{r3}$ point for at least 10 seconds (t1) (soaking step). Carbides completely melts in the course of such soaking at the soaking temperature (T1), and the intended residual γ is obtained at a high efficiency. This treatment is also effective for the formation of the bainitic ferrite during the cooling step after the soaking. No upper limit is particularly set for the soaking temperature (T1). The soaking is preferably conducted at a soaking temperature (T1) of up to about 1000° C. in view of, for example, the cost reduction.

When the steel sheet is retained at the soaking temperature (T1) for a time (t1) of less than 10 seconds, soaking effect of the entire steel sheet is insufficient, and as a consequence, proportion of the minute residual γ and formation of the bainitic ferrite will be insufficient (see the Example below). While longer retention time (t1) is preferable for the effective realization of the soaking merits, t1 in excess of 300 seconds only invites cost increase because the merits saturate at such t1. Accordingly, the retention time (t1) is preferably in the range of at least 60 seconds and up to 200 seconds.

Next, the steel sheet is cooled from the soaking temperature (T1) to the predetermined temperature (T2) at an average cooling rate (CR) of at least 10° C./sec. while avoiding ferrite transformation and pearlite transformation.

The tempering is conducted at a T2 (tempering temperature) of at least 100° C. and up to 300° C. The tempering at such temperature T2 is extremely important for generating a large amount of minute residual γ, and in the investigation by the inventors of the present invention, it has been demonstrated that, use of the temperature T2 in excess of 300° C. results in the failure of forming the intended minute residual γ due to the loss of the quenched structure and final increase in the formation of the lath-like coarse residual γ (see Example below). In the meanwhile, tempering may not be accomplished at a temperature T2 of less than 100° C. Accordingly, tempering is preferably conducted at temperature T2 of at least 180° C. and up to 300° C.

In addition, when the steel sheet is cooled from the soaking temperature (T1) to the temperature T2 at an average cooling rate (CR) of less than 10° C./sec., formation of the matrix bainitic ferrite will be reduced while formation of the polygonal ferrite and quasi-polygonal ferrite will be increased (see Example below) The average cooling rate is preferably at least 20° C./sec. While no upper limit is particularly set for the cooling rate, use of a fast cooling rate is preferable as long as the cooling is adequately conducted in view of practical production requirements. The methods used for the cooling include air cooling, mist cooling, and cooling of the roll used in the cooling with water.

More specifically, the cooling may be conducted as shown in FIG. 2A by cooling from the soaking temperature (T1) to the temperature T2 at a predetermined average cooling rate (CR), or as shown in FIG. 2B by cooling from the soaking temperature (T1) to the room temperature at once at a predetermined average cooling rate (CR), and then heating to temperature T2. While heating rate from the room temperature to the temperature T2 is not particularly limited, the heating rate is preferably in the range of approximately 1 to 10° C./sec. in view of the heating capability of the installation. As will be shown in the Examples, below, both of these procedures are capable of realizing the intended structure. However, in view of the productivity and economy, the method of FIG. 2A is more preferable.

Next, after retaining at such temperature (T2) for 100 to 600 seconds (t2) (tempering treatment), the steel sheet is cooled to room temperature. This enables efficient concentration of C to the residual γ in a short time, and finally, production of the minute residual γ at a large amount, and this also enables reliable formation of the predetermined amount of the bainitic ferrite. The retention time (t2) is preferably at least 120 seconds and up to 300 seconds. The method used for cooling the steel sheet from the temperature (T2) to the room temperature is not particularly limited, and exemplary methods include cooling with water, gas, or air.

The series of steps as described above may be conducted, for example, either by the CAL (real procedure), or by a CAL simulator, or the like.

(3) Post heat-treatment step (galvanization step)

Figure 3:
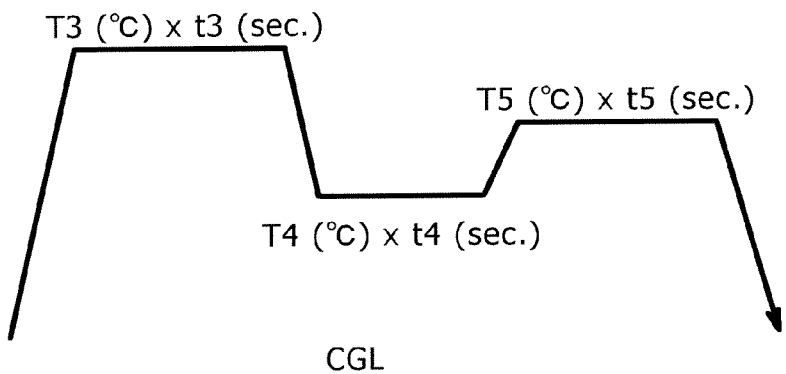
FIG. 3 schematically shows heating pattern of the continuous galvanizing line (CGL)

Next, the galvanization step which is carried out as a post-heat treatment is described by referring to the FIG. 3. This step is conducted mainly for reducing the size of the residual γ by using the structure (quenched martensite) generated by the continuous annealing step as described above. And this is the step which finally realizes the intended structure.

More specifically, the steel sheet which has been treated as described above is at a dual phase temperature (T3) which is not lower than the $A_{r1}$ point and not higher than the $A_{r3}$ point for 30 to 300 seconds (t3). When the soaking temperature (T3) is in excess of $A_{r3}$ point, the entire structure will be austenite (γ), while use of the soaking temperature (T3) below the $A_{r1}$ point will result in the failure of γ formation, and the intended residual γ will not be realized. The same applies to the retention time (t3), and the retention time (t3) outside such rage also result in the failure of forming the intended structure. Preferably, t3 is in the range of from at least 150 seconds to up to 250 seconds.

Next, the steel sheet is dipped in a galvanization bath. The conditions used for the dipping is not particularly limited, and this dipping is conducted, for example, at a temperature (T4) of about 330 to 380° C. for about 1 to 10 seconds (t4).

If necessary, the steel sheet may be further subjected to an alloying treatment, which is preferably conducted under the conditions including a temperature (T5) of about 400 to 650° C. and a time (t5) of 30 to 300 seconds (t5), T5×t5 preferably being approximately 20,000 or higher. When the alloying temperature (T5) is less than 350° C. or the alloying time (t5) is less than 30 seconds, C will not sufficiently concentrated in the residual γ, and the intended minute residual γ will not be formed. On the other hand, when the T5 is in excess of 650° C. or when the t5 is in excess of 300 seconds, the structure containing the residual γ will be decomposed.

When a galvanized steel sheet which is not alloyed is to be produced, the galvanized steel sheet that has been dipped in the galvanization bath may be subjected to a treatment at a heat pattern within the range of a temperature of about 350 to 450° C. and time of about 30 to 100 seconds, the temperature × time being less than approximately 20,000.

This step may be conducted in a galvanization apparatus in reducing atmosphere.

The galvanization step may not be necessary for producing the steel sheet of the present invention, and the steel sheet of the present invention may also be produced by conducting a heat treatment which is equivalent to the galvanization step. More specifically, the galvanization step may be replaced with a heat treatment in which the steel sheet is retained at a temperature (T4) of about 330 to 380° C. for about 1 to 10 seconds by some other means. The resulting steel sheet does not have the galvanized layer, but has the features (tensile strength, elongation, and stretch flangeability) intended in the present invention.)

EXAMPLES

Next, the present invention is described in further detail by referring to the Examples, which by no means limit the scope of the present invention. The present invention is may be adequately modified as long as such modification is consistent with the content of the present invention as described above and below, and such modification is also within the technical scope of the present invention.

Example 1

Evaluation of Production Conditions Using Composition and RQ (1)

A slab was produced by melting the steel material having the chemical composition shown in Table 1 (the residue including the iron and inevitable impurities), and the slab was hot rolled. The hot rolling was conducted by preliminarily heating the slab at 1250° C. for 30 minutes (finish rolling temperature, 880° C.), and the hot rolled steel sheet was cooled at an average cooling rate of 50° C./sec., retained at 650° C. for 30 minutes, and cooled with air (treatment corresponding to winding) to produce a hot rolled steel sheet having a thickness of about 3.2 mm. The resulting hot rolled steel sheet was pickled and cold rolled (rolling reduction, 50%) to produce a cold rolled steel sheet having a thickness of about 1.6 mm.

Next, continuous annealing line (CAL) and continuous galvanizing line (CGL) were conducted under the conditions shown in Tables 2 and 3. In these tables, T1, t1, T2, and t2 in the CAL corresponds to the indications used in FIG. 2A as described above, and T3, t3, T5, t5 in the CGL corresponds to the indications used in FIG. 3. In this Example, the conditions used in the CGL was 10 seconds at 460° C. (T4=460° C., t4=10 seconds in the FIG. 3 as described above) for all cases.

The resulting steel sheets were evaluated for their structure and mechanical properties by the procedure as described below. The minute residual γ was measured by the procedure as described above.

(Structure)

The steel sheet was etched with a repeller, and area percentage of the structure was observed with an optical microscope (at a magnification of 1000). The residual γ and C concentration of the residual γ were measured by grinding the steel sheet to a thickness of ¼, chemically polishing the surface, and observing the surface by X ray diffractometry. The evaluation procedure is described in detail in ISIJ Int. Vol. 33. (1993), No. 7, page 776.

(Tensile Strength and Elongation)

Tensile strength (TS) and elongation [total elongation (El)] were measured by conducting a using JIS No. 5 test piece. The tensile test was evaluated at a strain rate of 1 mm/sec.

(Stretch Flangeability)

Stretch flangeability was evaluated Japan Iron and Steel Federation Standard JFST1001. More specifically, a hole having a diameter of 10 mm was punched through a disk shaped test piece having a diameter of 100 mm and a thickness of 2.0 mm, and this hole was dilated using a 60° conical punch with the burr side facing upward, and hole (λ) was measured when the crack reached the other side of the plate.

In the present invention, the sample was evaluated as "pass" (the example of the present invention) when $TS(MPa) \times \lambda(\%) \geq 50000$, and $El \geq 18\%$ These results are shown Tables 2 to 3, in which the type of steel used (No. in Table 1) is also indicated. In Tables 2 to 3, and in Table 4 to 5 as described below, "other" structures include those which may remain after the production procedure of the Example (including pearlite, bainite, martensite, cementite, etc.).

TABLE 1

| No. | C | Si | Mn | P | S | Al | Ca | $A_{r3}$ (° C.) | $A_{r1}$ (° C.) |
|---|---|---|---|---|---|---|---|---|---|
| 1 | 0.01 | 2.0 | 2.0 | 0.03 | 0.001 | 0.035 | — | 937 | 644 |
| 2 | 0.08 | 2.0 | 1.9 | 0.02 | 0.001 | 0.040 | — | 902 | 645 |
| 3 | 0.13 | 2.0 | 2.1 | 0.02 | 0.002 | 0.038 | — | 882 | 643 |
| 4 | 0.17 | 2.0 | 2.0 | 0.03 | 0.001 | 0.039 | — | 874 | 644 |
| 5 | 0.23 | 2.0 | 2.1 | 0.03 | 0.001 | 0.039 | — | 858 | 643 |
| 6 | 0.18 | 0.5 | 1.9 | 0.02 | 0.001 | 0.042 | — | 806 | 688 |
| 7 | 0.18 | 0.9 | 1.9 | 0.02 | 0.001 | 0.038 | — | 824 | 677 |
| 8 | 0.19 | 1.5 | 2.0 | 0.03 | 0.001 | 0.039 | — | 846 | 658 |
| 9 | 0.17 | 2.0 | 2.0 | 0.02 | 0.001 | 0.039 | — | 874 | 644 |
| 10 | 0.17 | 2.3 | 2.1 | 0.02 | 0.001 | 0.039 | — | 885 | 634 |
| 11 | 0.18 | 2.1 | 1.0 | 0.03 | 0.001 | 0.038 | — | 898 | 652 |
| 12 | 0.18 | 2.1 | 1.3 | 0.03 | 0.002 | 0.039 | — | 892 | 649 |
| 13 | 0.18 | 2.0 | 2.8 | 0.02 | 0.001 | 0.039 | — | 853 | 635 |
| 14 | 0.17 | 2.0 | 2.0 | 0.02 | 0.001 | 0.040 | 0.0017 | 874 | 644 |

TABLE 2

| | | CAL | | | | | CGL | | | | Structure (%) | | | | Mechanical Properties | | | |
|---|---|---|---|---|---|---|---|---|---|---|---|---|---|---|---|---|---|---|
| | | CR | | | | | | | | | Total γR (proportion of minute γR) | BF | quasi-PF | Other structure | TS (MPa) | El (%) | λ (%) | TS × λ (%) |
| No. | Steel No. | T1 (° C.) | t1 (sec.) | (° C./sec.) | T2 (° C.) | t2 (sec.) | T3 (° C.) | t3 (sec.) | T5 (° C.) | t5 (sec.) | | | PF/ | | | | | |
| 1 | 1 | 970 | 120 | 27 | 260 | 180 | 860 | 200 | 440 | 130 | 0 (0) | 16 | 84 | 0 | 1002 | 13 | 28 | 28056 |
| 2 | 2 | 921 | 120 | 28 | 260 | 180 | 860 | 200 | 440 | 130 | 4 (37) | 55 | 36 | 5 | 1003 | 18 | 38 | 38114 |
| 3 | 3 | 900 | 120 | 27 | 260 | 180 | 860 | 200 | 440 | 130 | 10 (65) | 84 | 6 | 0 | 1008 | 20 | 58 | 58464 |
| 4 | 4 | 900 | 120 | 26 | 260 | 180 | 860 | 200 | 440 | 130 | 13 (67) | 81 | 5 | 1 | 1001 | 23 | 55 | 55055 |
| 5 | 5 | 898 | 120 | 28 | 260 | 180 | 860 | 200 | 440 | 130 | 14 (66) | 80 | 5 | 1 | 1008 | 24 | 56 | 56448 |
| 6 | 6 | 860 | 120 | 27 | 260 | 180 | 790 | 200 | 440 | 130 | 2 (60) | 35 | 59 | 4 | 970 | 17 | 53 | 51410 |
| 7 | 7 | 882 | 120 | 29 | 260 | 180 | 790 | 200 | 440 | 130 | 8 (68) | 82 | 8 | 2 | 990 | 21 | 52 | 51480 |
| 8 | 8 | 880 | 120 | 28 | 260 | 180 | 790 | 200 | 440 | 130 | 9 (70) | 81 | 7 | 3 | 1005 | 21 | 54 | 54270 |
| 9 | 9 | 884 | 120 | 27 | 260 | 180 | 790 | 200 | 440 | 130 | 8 (69) | 80 | 10 | 2 | 1000 | 20 | 53 | 53000 |
| 10 | 10 | 881 | 120 | 28 | 260 | 180 | 790 | 200 | 440 | 130 | 9 (70) | 82 | 8 | 1 | 1029 | 20 | 52 | 53508 |
| 11 | 11 | 900 | 120 | 27 | 260 | 180 | 830 | 200 | 440 | 130 | 9 (30) | 16 | 70 | 5 | 950 | 18 | 35 | 33250 |
| 12 | 12 | 900 | 120 | 28 | 260 | 180 | 830 | 200 | 440 | 130 | 8 (40) | 24 | 60 | 8 | 997 | 19 | 33 | 32901 |

TABLE 2-continued

| | | CAL | | | | CGL | | | | Structure (%) | | | | Mechanical Properties | | | |
| | | CR | | | | | | | | Total γR (proportion | | PF/ | | | | | |
| No. | Steel No. | T1 (°C.) | t1 (sec.) | (°C./ sec.) | T2 (°C.) | t2 (sec.) | T3 (°C.) | t3 (sec.) | T5 (°C.) | t5 (sec.) | of minute γR) | BF | quasi-PF | Other structure | TS (MPa) | El (%) | λ (%) | TS × λ (%) |
|---|---|---|---|---|---|---|---|---|---|---|---|---|---|---|---|---|---|
| 13 | 13 | 900 | 120 | 28 | 260 | 180 | 830 | 200 | 440 | 130 | 10 (68) | 81 | 8 | 1 | 1024 | 20 | 64 | 65536 |
| 14 | 14 | 900 | 120 | 27 | 260 | 180 | 830 | 200 | 440 | 130 | 11 (66) | 81 | 7 | 1 | 1018 | 22 | 79 | 80422 |

γR = residual austenite,
BF = bainitic ferrite,
PF = polygonal ferrite

TABLE 3

| | | CAL | | | | CGL | | | | Structure (%) | | | | Mechanical Properties | | | |
| | | CR | | | | | | | | Total γR (proportion | | PF/ | | | | | |
| No. | Steel No. | T1 (°C.) | t1 (sec.) | (°C./ sec.) | T2 (°C.) | t2 (sec.) | T3 (°C.) | t3 (sec.) | T5 (°C.) | t5 (sec.) | of minute γR) | BF | quasi-PF | Other structure | TS (MPa) | El (%) | λ (%) | TS × λ (%) |
|---|---|---|---|---|---|---|---|---|---|---|---|---|---|---|---|---|---|
| 15 | 4 | 900 | 120 | 28 | 100 | 180 | 860 | 200 | 440 | 130 | 8 (93) | 85 | 5 | 2 | 1010 | 21 | 73 | 73730 |
| 16 | 4 | 900 | 120 | 29 | 200 | 180 | 860 | 200 | 440 | 130 | 9 (85) | 83 | 8 | 0 | 1021 | 20 | 69 | 70449 |
| 17 | 4 | 900 | 120 | 28 | 300 | 180 | 860 | 200 | 440 | 130 | 8 (65) | 84 | 6 | 2 | 1003 | 19 | 58 | 58174 |
| 18 | 4 | 900 | 120 | 27 | 400 | 180 | 860 | 200 | 440 | 130 | 9 (55) | 79 | 12 | 0 | 1004 | 19 | 39 | 39156 |
| 19 | 4 | 900 | 120 | 29 | 500 | 180 | 860 | 200 | 440 | 130 | 8 (45) | 74 | 17 | 1 | 1014 | 19 | 28 | 28392 |
| 20 | 4 | 900 | 120 | 28 | 600 | 180 | 860 | 200 | 440 | 130 | 8 (28) | 63 | 29 | 0 | 983 | 18 | 20 | 19660 |
| 21 | 4 | 950 | 120 | 27 | 200 | 180 | 860 | 200 | 440 | 130 | 12 21 | 81 | 6 | 1 | 1002 | 18 | 54 | 54108 |
| 22 | 4 | 900 | 120 | 26 | 200 | 180 | 860 | 200 | 440 | 130 | 9 (85) | 82 | 8 | 1 | 1021 | 18 | 55 | 56155 |
| 23 | 4 | 800 | 120 | 27 | 200 | 180 | 860 | 200 | 440 | 130 | 2 (45) | 66 | 32 | 0 | 1004 | 16 | 31 | 31124 |
| 24 | 4 | 900 | 120 | 8 | 200 | 180 | 860 | 200 | 440 | 130 | 12 (76) | 48 | 40 | 0 | 1003 | 18 | 32 | 32096 |
| 25 | 4 | 900 | 120 | 15 | 200 | 180 | 860 | 200 | 440 | 130 | 13 (68) | 81 | 5 | 1 | 1005 | 17 | 31 | 31155 |
| 26 | 4 | 900 | 120 | 28 | 200 | 180 | 860 | 200 | 440 | 130 | 9 (85) | 82 | 8 | 1 | 1021 | 18 | 55 | 56155 |
| 27 | 4 | 900 | 5 | 27 | 200 | 180 | 860 | 200 | 440 | 130 | 8 (40) | 75 | 17 | 0 | 1003 | 17 | 29 | 29087 |
| 28 | 4 | 900 | 120 | 26 | 200 | 50 | 860 | 200 | 440 | 130 | 2 (80) | 79 | 17 | 2 | 1002 | 18 | 31 | 31062 |
| 29 | 4 | 900 | 120 | 28 | 200 | 180 | 860 | 200 | 440 | 130 | 9 (85) | 82 | 8 | 1 | 1021 | 18 | 55 | 56155 |
| 30 | 4 | 900 | 120 | 27 | 200 | 180 | 900 | 200 | 440 | 130 | 9 (30) | 80 | 11 | 0 | 1010 | 18 | 20 | 20200 |
| 31 | 4 | 900 | 120 | 28 | 200 | 180 | 860 | 10 | 440 | 130 | 3 (80) | 59 | 38 | 0 | 1003 | 19 | 22 | 22066 |
| 32 | 4 | 900 | 120 | 26 | 200 | 180 | 860 | 500 | 440 | 130 | 9 (30) | 79 | 12 | 0 | 1021 | 18 | 31 | 31651 |
| 33 | 4 | 900 | 120 | 27 | 200 | 180 | 860 | 200 | 440 | 10 | 2 (70) | 78 | 20 | 0 | 1005 | 18 | 23 | 23115 |
| 34 | 4 | 900 | 120 | 28 | 200 | 180 | 860 | 200 | 440 | 500 | 3 (80) | 77 | 20 | 0 | 1007 | 18 | 24 | 24168 |
| 35 | 4 | 900 | 120 | 28 | 200 | 180 | 800 | 200 | 440 | 130 | 0 (0) | 80 | 16 | 4 | 1003 | 17 | 18 | 18054 |

γR = residual austenite,
BF = bainitic ferrite,
PF = polygonal ferrite

The results shown in Tables 2 and 3 indicate the following.

The effects of the composition of the steel were evaluated in Nos. 1 to 14 in Table 2, and the production conditions used in Nos. 1 to 14 all satisfied the preferable conditions of the present invention.

Among these, Nos. 3 to 5, 7 to 10, and 13 to 14 are the Examples of the present invention in which the composition of the steel used was within the scope of the present invention, and in these Examples, the steel sheet had the intended structure, well balanced tensile strength and stretch flangeability, and excellent elongation properties.

In contrast, Nos. 1 to 2 are Comparative Examples which used Nos. 1 to 2 of Table 1 in which C content was insufficient, and in these cases, the resulting steel sheet had neither the intended structure (BF and residual γ) nor the mechanical properties of the intended level.

No. 6 is also a Comparative Example which used No. 6 of Table 1 in which Si content was insufficient, and in this case, the steel sheet did not have the intended matrix structure. On the other hand, Nos. 11 to 12 are Comparative Examples which used Nos. 11 to 12 of Table 1 in which Mn content was insufficient, and in these cases, the intended amount of matrix structure and residual γ was not obtained. As a consequence, all of these Comparative Examples exhibited poor mechanical properties.

The effects of production conditions were evaluated in Nos. 15 to 35 of Table 3 by using No. 4 of Table 1 which was within scope of the present invention.

First, Nos. 15 to 20 of Table 3 are the cases in which tempering temperature (T2) in the CAL was changed in the range of 100 to 600° C.

Among these, Nos. 15 to 17 are the Examples of the present invention in which the steel sheet was produced at the tempering temperature within the scope of the present invention, and in these Examples, the steel sheet had the intended structure, well balanced tensile strength and stretch flangeability, and excellent elongation properties.

In contrast, Nos. 18 to 20 are Comparative Examples in which T2 was excessively high, and the steel sheet had reduced proportion of minute residual γ, and in the case of No. 20, the steel sheet exhibited poor mechanical properties since reduced amount of the matrix BF structure was generated.

Figure 4:
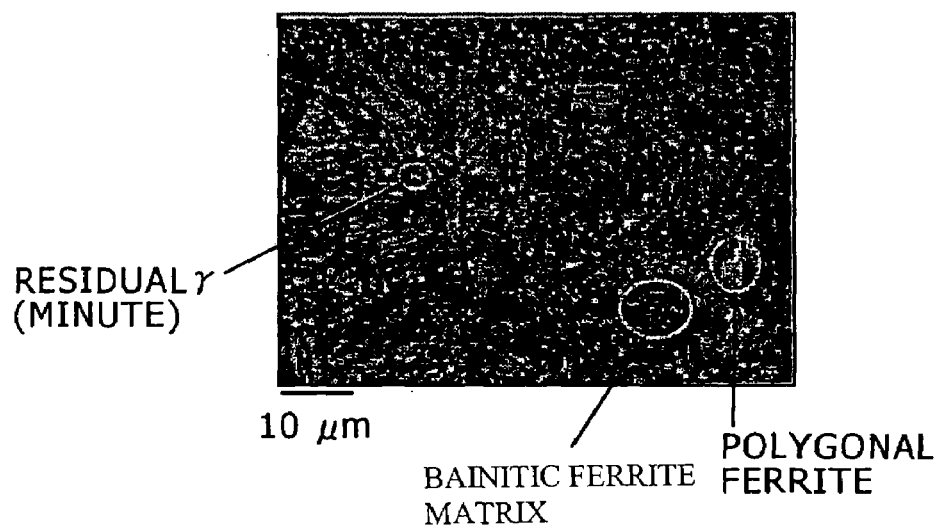
FIG. 4 is a photograph taken by an optical microscope (at a magnification of 1000) for No. 16 in Table 3 of Example 1.
Figure 5:
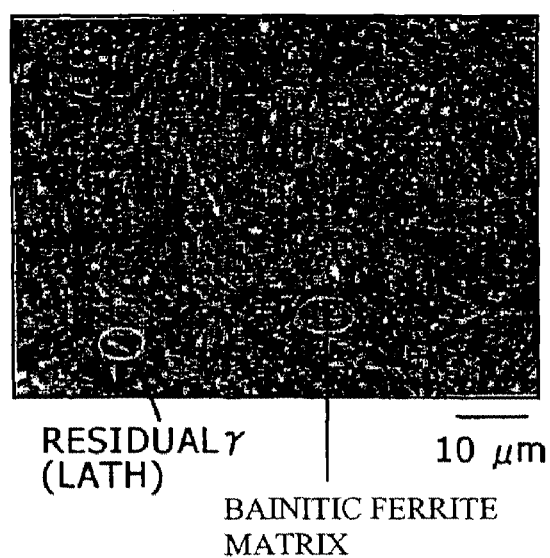
FIG. 5 is a photograph taken by an optical microscope (at a magnification of 1000) for No. 19 in Table 3 of Example 1.

For the purpose of reference, a picture (at a magnification of 1000) of No. 16 (the Example of the present invention) taken by an optical microscope is shown in FIG. 4, and a picture (at a magnification of 1000) of No. 19 (Comparative Example) taken by an optical microscope is shown in FIG. 5. As evident from the comparison of these pictures, while generation of a large amount of minute residual γ is observed the Example of the present invention shown in FIG. 4, such generation of the minute residual γ was hardly observed, and instead, a large amount of lath residual γ was observed in the Comparative Example shown in FIG. 5.

Nos. 21 to 23 of Table 3 are the cases in which soaking temperature (T1) in the CAL was changed in the range of 800 to 950° C.

Among these, Nos. 21 to 22 are the Example of the present invention in which the steel sheet was produced at the soaking temperature within the scope of the present invention, and in these Examples, the steel sheet had the intended structure, well balanced tensile strength and stretch flangeability, and excellent elongation properties.

In contrast, No. 23 is a Comparative Example in which T1 was lower than the temperature ($A_{r3}$ point=at least 874° C.) defined in the present invention, and the resulting steel sheet had poor mechanical properties since the proportion of minute residual γ was low and the intended matrix structure could not be obtained.

Nos. 24 to 25 of Table 3 are the cases in which average cooling rate (CR) in the CAL was changed in the range of 8 to 15° C./sec.

Among these, No. 25 is the Example of the present invention in which the steel sheet was produced at the average cooling rate within the scope of the present invention, and in this Example, the steel sheet had the intended structure and excellent mechanical properties.

In contrast, No. 24 is the Comparative Example in which CR is excessively low, and the intended matrix structure could not be obtained and the mechanical properties were poor.

Nos. 26 to 27 of Table 3 are the cases in which soaking time (t1) in the CAL was changed in the range of 5 to 120 seconds.

Among these, No. 26 is the Example of the present invention in which the steel sheet was produced at the soaking time (t) within the scope of the present invention, and in this Example, the steel sheet had the intended structure and excellent mechanical properties.

In contrast, No. 27 is a Comparative Example in which t1 was excessively short, and the steel sheet exhibited poor mechanical properties since the steel sheet had reduced proportion of minute residual γ and a large amount of PF or quasi-PF structure.

Nos. 28 to 29 of Table 3 are the cases in which tempering time (t2) in the CAL was changed in the range of 50 to 180 seconds.

Among these, No. 29 is the Example of the present invention in which the steel sheet was produced at the austempering time (t2) within the scope of the present invention, and in these Example, the steel sheet had the intended structure and excellent mechanical properties.

In contrast, No. 28 is the Comparative Example in which t2 was excessively short, and the mechanical properties were insufficient due to insufficient tempering and increase of PF structure after the CGL.

Nos. 30 to 35 of Table 3 are the Comparative Examples in which conditions used in the CGL were changed, and the steel sheets produced in these cases were insufficient as described below.

Among these, No. 30 is the Comparative Example using an excessively high soaking temperature (T3), and the mechanical properties were poor since the proportion of the minute residual γ was low and a large amount of PF or quasi-PF structure was generated.

No. 31 is the Comparative Example using an excessively short soaking time (t3), and the mechanical properties were poor since the intended matrix structure was not obtained.

No. 32 is the Comparative Example using an excessively long soaking time (t3), and the steel sheet exhibited poor mechanical properties since the steel sheet had reduced proportion of minute residual γ and a large amount of PF or quasi-PF structure.

No. 33 is the Comparative Example using an excessively short alloying time (t5), and No. 34 is the Comparative Example using an excessively long alloying time (t5). The steel sheets produced in these cases exhibited poor mechanical properties since the steel sheet had reduced proportion of minute residual γ and a large amount of PF or quasi-PF structure.

No. 35 is the Comparative Example using an excessively low soaking temperature (T3), and the steel sheet exhibited poor mechanical properties since a large amount of PF or quasi-PF structure was generated.

Example 2

Evaluation of Production Conditions using WQ (2)

In this Example, the CAL was conducted by using the heat pattern shown in FIG. 2B instead of the heat pattern shown in FIG. 2A used in Example 1.

More specifically, the steel material shown as No. 4 in Table 1 was used, and the cold rolled steel sheet was produced as in the case of Example 1, and then, continuous annealing line (CAL) and continuous galvanizing line (CGL) were conducted under the conditions shown in Table 4. In Table 4, T1, t1, T2, and t2 in the CAL corresponds to the indications used in FIG. 2B, and T3, t3, T5, and t5 in the CGL corresponds to the indications used in FIG. 3. The conditions used in the CGL were the same as those used in Example 1.

The resulting steel sheets were evaluated for their structure and mechanical properties by the same procedure as Example 1. The results are shown in Table 4.

TABLE 4

| | | CAL | | | | | | | | Structure (%) | | | | Mechanical Properties | | | |
|---|---|---|---|---|---|---|---|---|---|---|---|---|---|---|---|---|---|
| | | CR | | | | CGL | | | | Total γR (proportion of minute γR) | BF | PF/ quasi-PF | Other structure | TS (MPa) | El (%) | λ (%) | TS × λ (%) |
| No. | Steel No. | T1 (°C.) | t1 (sec.) | (°C./ sec.) | T2 (°C.) | t2 (sec.) | T3 (°C.) | t3 (sec.) | T5 (°C.) | t5 (sec.) | | | | | | | | |
| 1 | 4 | 900 | 120 | 20 | 100 | 180 | 860 | 200 | 440 | 130 | 12 (93) | 82 | 5 | 1 | 1012 | 23 | 89 | 90068 |
| 2 | 4 | 900 | 120 | 19 | 200 | 180 | 860 | 200 | 440 | 130 | 11 (85) | 81 | 6 | 2 | 1018 | 22 | 70 | 71260 |
| 3 | 4 | 900 | 120 | 20 | 300 | 180 | 860 | 200 | 440 | 130 | 10 (73) | 82 | 6 | 2 | 1001 | 20 | 69 | 69069 |
| 4 | 4 | 900 | 120 | 19 | 400 | 180 | 860 | 200 | 440 | 130 | 7 (53) | 75 | 14 | 4 | 1002 | 20 | 40 | 40080 |
| 5 | 4 | 900 | 120 | 20 | 500 | 180 | 860 | 200 | 440 | 130 | 7 (52) | 70 | 14 | 9 | 1010 | 19 | 28 | 28280 |
| 6 | 4 | 900 | 120 | 20 | 600 | 180 | 860 | 200 | 440 | 130 | 6 (32) | 63 | 30 | 1 | 988 | 19 | 20 | 19760 |

γR = residual austenite,
BF = bainitic ferrite,
PF = polygonal ferrite

The results shown in Table 4 indicate the following.

Among these, Nos. 1 to 3 of Table 4 are the Examples of the present invention and the steel sheets were produced under the production conditions within the scope of the present invention, and in these Examples, the steel sheet had the intended structure, well balanced tensile strength and stretch flangeability, and excellent elongation properties.

In contrast, No. 4 to 6 are Comparative Examples which used excessively high tempering temperature (T2) in the CAL, and the resulting steel sheet had reduced proportion of the minute residual γ, and in No. 6, the steel sheet had poor mechanical properties since generation of the matrix BF structure was reduced.

Example 3

Evaluation of TRIP Steel Sheet Containing Polygonal Ferrite as its Matrix (Reference)

Figure 6:
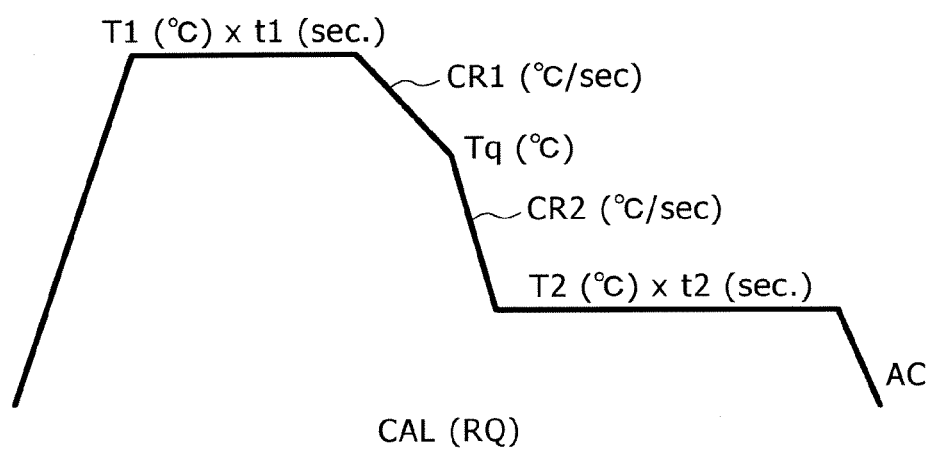
FIG. 6 schematically shows heating pattern of the continuous annealing line (CAL) in Example 3.

For reference purposes, effects of the formation of the minute residual γ on the stretch flangeability were evaluated in this Example for the TRIP steel sheet (TDP steel) having the polygonal ferrite as its matrix for the reference. In this Example, continuous annealing line shown in FIG. 6 was conducted to generate PF structure. As shown in FIG. 6, the steel sheet was cooled from the soaking temperature (T1) to the tempering temperature (T2) at varying cooling rate.

More specifically, the steel material shown as No. 4 in Table 1 was used, and the cold rolled steel sheet was produced as in the case of Example 1, and then, continuous annealing line (CAL) and continuous galvanizing line (CGL) were conducted under the conditions shown in Table 5. In Table 5, T1, t1, T2, and t2 in the CAL corresponds to the indications used in FIG. 6.

The resulting steel sheets were evaluated for their structure and mechanical properties by the same procedure as Example 1. The results are shown in Table 5.

TABLE 5

| | | CAL | | | | | | | Structure (%) | | | | Mechanical properties | | | |
|---|---|---|---|---|---|---|---|---|---|---|---|---|---|---|---|---|
| No. | Steel No. | T1 (°C.) | t1 (sec.) | CR1 (°C./sec.) | Tq (°C.) | CR1 (°C./s) | T2 (°C.) | t2 (sec.) | Total γR (proportion of minute γR) | BF | PF/ quasi-PF | Other structure | TS (MPa) | El (%) | λ (%) | TS × λ (%) |
| 1 | 4 | 900 | 90 | 8 | 681 | 98 | 300 | 150 | 13 (90) | 6 | 80 | 1 | 807 | 22 | 23 | 18561 |
| 2 | 4 | 900 | 90 | 9 | 683 | 98 | 400 | 150 | 12 (85) | 8 | 79 | 1 | 908 | 23 | 21 | 19068 |
| 3 | 4 | 900 | 90 | 8 | 684 | 97 | 500 | 150 | 11 (65) | 9 | 78 | 2 | 930 | 22 | 22 | 20460 |
| 4 | 4 | 900 | 90 | 9 | 682 | 99 | 600 | 150 | 8 (30) | 6 | 86 | 0 | 952 | 21 | 12 | 11424 |

γR = residual austenite,
BF = bainitic ferrite,
PF = polygonal ferrite

As shown in Table 5, increase in the stretch flangeability was little observed in the TBF steel having the PF as its matrix even when the proportion of the minute residual γ were increased.

What is claimed is:

1. A steel sheet comprising:
   0.10-0.20 wt. % C;
   0.8-2.5 wt. % Si;
   1.5-2.5 wt. % Mn;
   0.01-0.10 wt. % Al;
   $0 \leq P \leq 0.1$ wt. %; and
   $0 < S \leq 0.002$ wt. %,
   wherein the steel sheet has a structure comprising $\geq 70$ area % bainitic ferrite, 2-20 area % total residual austenite, and 0-15 area % polygonal ferrite and quasi-polygonal ferrite, relative to a total area percentage of the structure, wherein a proportion of minute residual austenite having an average particle size of ≦5 μm relative to the total residual austenite is ≧60%, wherein the steel sheet exhibits a tensile strength (TS) of ≧980 MPa and a total elongation (El) of ≧18%, and wherein a relationship of the tensile strength (TS) and a stretch flangeability (λ) within the steel sheet satisfies the following equation:

$$TS(MPa) \times \lambda(\%) \geq 50,000.$$

2. The steel sheet according to claim 1, wherein the steel sheet further comprises 0.0003<Ca<0.002 wt. %.

3. The steel sheet according to claim 1, wherein the structure of the steel sheet further comprises 0-10 area % martensite relative to a total area percentage of the structure.

4. The steel sheet according to claim 1, wherein the structure of the steel sheet comprises 5-18 area % total residual austenite relative to a total area percentage of the structure.

5. The steel sheet according to claim 1, wherein the structure of the steel sheet comprises 7-16 area % total residual austenite relative to a total area percentage of the structure.

6. The steel sheet according to claim 1, wherein a proportion of minute residual austenite having an average particle size of ≦5 μm relative to the total residual austenite is ≧70%.

7. The steel sheet according to claim 1, wherein a proportion of minute residual austenite having an average particle size of <5 μm relative to the total residual austenite is ≧80%.

8. The steel sheet according to claim 1, wherein a proportion of minute residual austenite having an average particle size of ≦5 μm relative to the total residual austenite is 100%.

9. The steel sheet according to claim 1, wherein the minute residual austenite has an average particle size of ≦4 μm.

10. The steel sheet according to claim 1, wherein the minute residual austenite has an average particle size of ≦3 μm.

11. The steel sheet according to claim 1, wherein the steel sheet exhibits a tensile strength (TS) of ≧1,000 MPa and a total elongation (El) of ≧20%, and wherein a relationship of the tensile strength (TS) and a stretch flangeability (λ) within the steel sheet satisfies the following equation:

$$TS(MPa) \times \lambda(\%) \geq 60,000.$$

12. A method for producing the steel sheet according to claim 1, wherein the method comprises subjecting the steel sheet to tempering at a temperature of 100-300° C. for a period of 100-600 seconds.

13. The method for producing the steel sheet according to claim 12, wherein the method comprises subjecting the steel sheet to tempering at a temperature of 180-300° C. for a period of 120-300 seconds.

14. A steel sheet produced by a method comprising subjecting the steel sheet to tempering at a temperature of 100-300° C. for a period of 100-600 seconds, wherein the steel sheet comprises:

0.10-0.20 wt. % C;
0.8-2.5 wt. % Si;
1.5-2.5 wt. % Mn;
0.01-0.10 wt. % Al;
0≦P≦0.1 wt. %; and
0<S≦0.002 wt. %, wherein the steel sheet has a structure comprising ≧70 area % bainitic ferrite, 2-20 area % total residual austenite, and 0-15 area % polygonal ferrite and quasi-polygonal ferrite, relative to a total area percentage of the structure, wherein a proportion of minute residual austenite having an average particle size of ≦5 μm relative to the total residual austenite is ≧60%, wherein the steel sheet exhibits a tensile strength (TS) of ≧980 MPa and a total elongation (El) of ≧18%, and wherein a relationship of the tensile strength (TS) and a stretch flangeability (λ) within the steel sheet satisfies the following equation:

$$TS(MPa) \times \lambda(\%) \geq 50,000.$$

15. The steel sheet according to claim 14, wherein the method comprises subjecting the steel sheet to tempering at a temperature of 180-300° C. for a period of 120-300 seconds.

* * * * *